(12) United States Patent
Kim et al.

(10) Patent No.: US 9,365,050 B2
(45) Date of Patent: Jun. 14, 2016

(54) LIGHT-EMITTING ELEMENT ARRAY MODULE AND METHOD OF CONTROLLING LIGHT-EMITTING ELEMENT ARRAY CHIPS

(71) Applicant: Samsung Electronics Co., Ltd., Suwon-si (KR)

(72) Inventors: Su-hwan Kim, Suwon-si (KR); Wan-chin Kim, Seoul (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/627,124

(22) Filed: Feb. 20, 2015

(65) Prior Publication Data

US 2015/0375523 A1    Dec. 31, 2015

Related U.S. Application Data

(60) Provisional application No. 62/017,473, filed on Jun. 26, 2014.

(30) Foreign Application Priority Data

Sep. 29, 2014    (KR) .................. 10-2014-0130330

(51) Int. Cl.
*B41J 2/435*    (2006.01)
*B41J 2/47*     (2006.01)
*B41J 2/45*     (2006.01)

(52) U.S. Cl.
CPC ..... *B41J 2/47* (2013.01); *B41J 2/45* (2013.01)

(58) Field of Classification Search
CPC ...... G03G 15/043; H50B 33/08; H05B 37/02; H05B 37/0281; B41J 2/385; B41J 2/45

USPC ............... 347/116, 229, 234, 235, 238, 237, 347/247–250
See application file for complete search history.

(56) References Cited

U.S. PATENT DOCUMENTS

| 6,452,342 | B1  |  9/2002 | Ohno |
| 6,657,651 | B2* | 12/2003 | Ohno ........................ 347/235 |
| 6,710,794 | B1* |  3/2004 | Yamazaki et al. .......... 347/237 |
| 7,954,917 | B2* |  6/2011 | Inoue ............................. 347/9 |

FOREIGN PATENT DOCUMENTS

| EP | 1186427      | 3/2002 |
| JP | 2003-170625  | 6/2003 |
| WO | 2015/115713  | 8/2015 |

OTHER PUBLICATIONS

Extended European Search Report dated Nov. 23, 2015 in European Patent Application No. 15173449.8.

* cited by examiner

*Primary Examiner* — Hai C Pham
(74) *Attorney, Agent, or Firm* — Staas & Halsey LLP

(57) ABSTRACT

A light-emitting element array module includes a control driver configured to receive print data and operate, and light-emitting element array chips configured to receive a signal from the control driver, respectively, and operate, wherein the light-emitting element array chips are connected to the control driver through respective data lines, and the control driver controls an operation point in time of each of the light-emitting element array chips by adjusting input points in time of a start signal and a data signal according to a registration error of each of the light-emitting element array chips.

16 Claims, 14 Drawing Sheets

LIGHT-EMITTING ELEMENT ARRAY MODULE AND METHOD OF CONTROLLING LIGHT-EMITTING ELEMENT ARRAY CHIPS

CROSS-REFERENCE TO RELATED APPLICATIONS

This application claims the priority benefit of U.S. Provisional Application No. 62/017,473, filed on Jun. 26, 2014, in the U.S. Patent and Trademark Office, and Korean Patent Application No. 10-2014-01130330, filed on Sep. 29, 2014, in the Korean Intellectual Property Office, the disclosures of which are incorporated herein in their entireties by reference.

BACKGROUND

1. Field

The following description relates to light-emitting element array modules and methods of controlling light-emitting element array chips.

2. Description of the Related Art

An image forming apparatus using light-emitting element array chips receives print data from a personal computer (PC) and forms an image by using light-emitting elements. When the light-emitting elements emit light, an electrostatic latent image is formed on a photoconductor drum in the image forming apparatus. Thereafter, a print image is output through development, transfer, and fusing processes.

The light-emitting element array chips are connected to a control unit by wire bondings. Therefore, as many wire bondings as the number of signals output from the control unit are required.

SUMMARY

One or more embodiments include light-emitting element array modules wherein the number of wire bondings is reduced, and methods of controlling light-emitting element array chips.

One or more embodiments include a method of applying an additional signal to a light-emitting element in order to smoothly operate a transfer element which is included in a light-emitting element array module.

Additional aspects will be set forth in part in the description which follows and, in part, will be apparent from the description, or may be learned by practice of the presented embodiments.

According to one or more embodiments, a light-emitting element array module includes a control driver configured to receive print data and operate, and light-emitting element array chips configured to receive a signal from the control driver, respectively, and operate, wherein the light-emitting element array chips are connected to the control driver through respective data lines, and the control driver controls an operation point in time of each of the light-emitting element array chips by adjusting input points in time of a start signal and a data signal according to a registration error of each of the light-emitting element array chips.

According to one or more embodiments, a method of controlling light-emitting element array chips includes receiving print data, applying a start signal to each of the light-emitting element array chips through data lines, and applying a data signal to each of the light-emitting element array chips through the data lines after the start signal is applied, wherein the start signal is applied at an operation point in time of each of the light-emitting element array chips according to a registration error of each of the light-emitting element array chips.

According to one or more embodiments, a method of controlling light-emitting element array chips includes receiving print data, applying a transfer signal operating a transfer element array, applying a data signal operating a light-emitting element array, and applying an additional signal emitting a light-emitting element at a point in time when the transfer signal is changing from a high-level to a low-level.

According to one or more embodiments, a light-emitting element array module includes a light-emitting element array chip having a light-emitting element array and a transfer element array, and a control driver applying a transfer signal operating a transfer element array by receiving print data, and a data signal operating a light-emitting element array, wherein the control driver applies an additional signal emitting a light-emitting element at a point in time when the transfer signal is changing from a high-level to a low-level.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
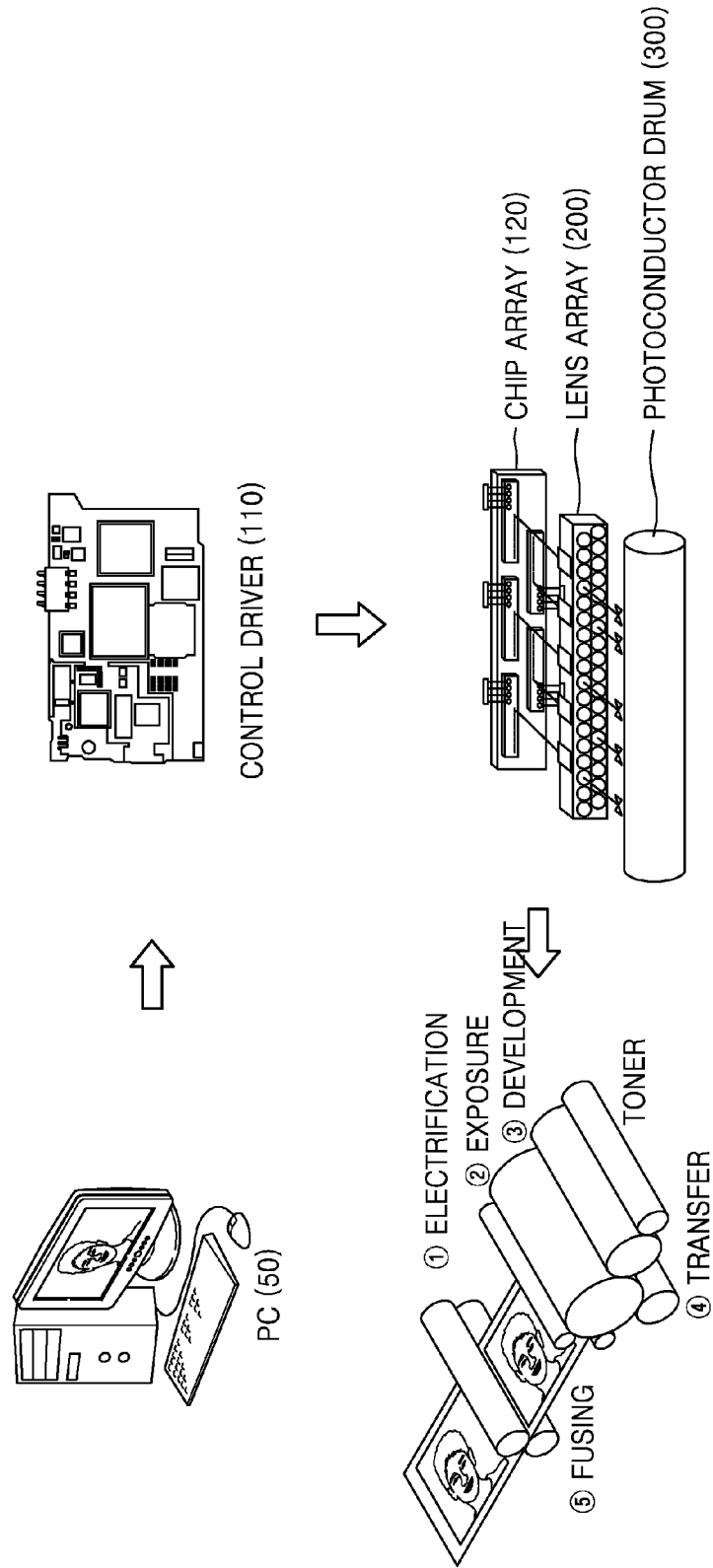
FIG. 1 is a diagram illustrating a process of outputting an image by using a light-emitting element array.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Various embodiments and modifications, and embodiments are illustrated in the drawings and are described in detail. However, it will be understood that embodiments include modifications, equivalents, and substitutions falling within the spirit and scope of the inventive concept.

Although terms such as "first" and "second" may be used herein to describe various elements or components, these elements or components should not be limited by these terms. These terms are used to distinguish one element or component from another element or component.

The terms used herein describe embodiments and are not intended to limit the scope of the inventive concept. As used herein, the singular forms "a", "an", and "the" are intended to include the plural forms as well, unless the context clearly indicates otherwise. It will be understood that terms such as "comprise", "include", and "have", when used herein, do not preclude the presence or addition of one or more other features, integers, steps, operations, elements, components, or combinations thereof.

Hereinafter, embodiments are described in detail with reference to the accompanying drawings. In the following description, like reference numerals denote like elements, and redundant descriptions thereof are omitted.

FIG. 1 is a diagram illustrating a process of outputting an image by using a light-emitting element array. Referring to FIG. 1, upon receiving print data from a personal computer (PC) 50, an image forming apparatus performs operations for outputting an image.

The image forming apparatus forms an electrostatic latent image on a photoconductor drum 300 by using light-emitting elements and outputs an image through development, transfer, and fusing processes.

The image forming apparatus includes a control driver 110, a chip array 120, a lens array 200, and the photoconductor drum 300.

The control driver 110 controls the chip array 120 according to the print data received from the PC 50. The chip array 120 includes a plurality of light-emitting element array chips. The control driver 110 may separately control the light-emitting element array chips. A method of controlling light-emitting element array chips by the control driver 110 is illustrated in FIG. 2.

The lens array 200 is arranged in an axial direction (i.e., a main scanning direction) of the photoconductor drum 300. Light having passed through the lens array 200 forms an image on a surface of the photoconductor drum 300.

The photoconductor drum 300 is exposed to light to form an electrostatic latent image. A developer (not shown) develops the electrostatic latent image formed on the photoconductor drum 300.

Figure 2:
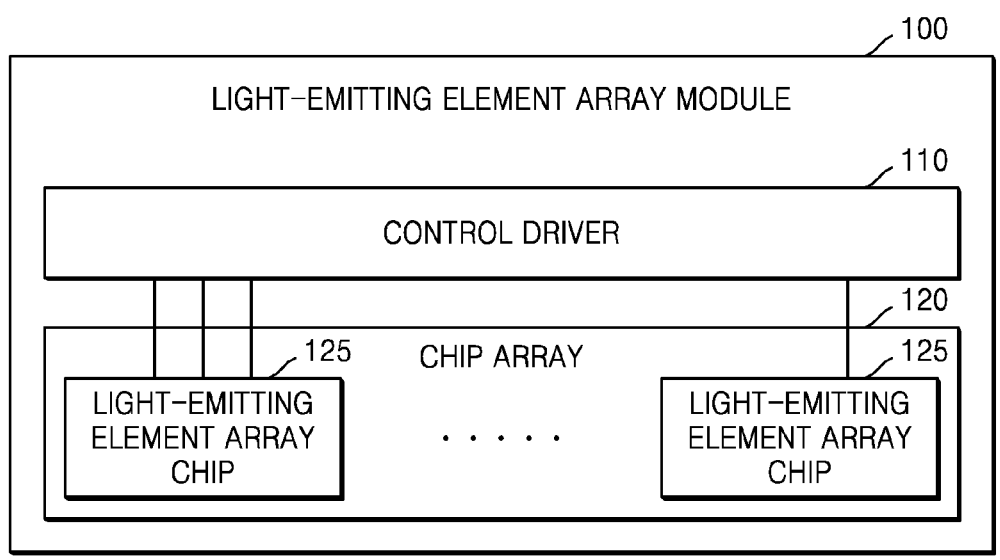
FIG. 2 is a diagram illustrating a light-emitting element array module according to an embodiment.

FIG. 2 is a diagram illustrating a light-emitting element array module according to an embodiment. Referring to FIG. 2, the light-emitting element array module 100 may compensate for (or correct) a registration error of light-emitting element array chips 125. A registration error in a main scanning direction may exist between the light-emitting element array chips 125. When the light-emitting element array chips 125 emit light at an identical point in time, the registration error between the light-emitting element array chips 125 may not be compensated for. Thus, the light-emitting element array module 100 according to an embodiment may compensate for the registration error of the light-emitting element array chips 125 by separately controlling the light-emitting element array chips 125. In other words, the light-emitting element array module 100 adjusts a point in time to apply a start signal to each of the light-emitting element array chips 125, thereby controlling operation points in time of the light-emitting element array chips 125.

The control driver 110 receives print data and operates. The control driver 110 receives print data from a central processing unit (CPU) or a main board included in the image forming apparatus, and controls the on/off of light-emitting elements according to the received print data. The print data is data representing an image to be formed. The control driver 110 controls the on/off of the light-emitting elements according to the print data, and controls the operation points in time of the light-emitting element array chips 125 in consideration of the registration error of the light-emitting element array chips 125.

The control driver 110 further includes a memory (not shown) for storing information about the operation points in time of the light-emitting element array chips 125. In other words, the control driver 110 pre-stores information about the operation points in time of the light-emitting element array chips 125 in the memory in consideration of the registration error.

The control driver 110 controls the operation points in time of the light-emitting element array chips 125 by separately applying start signals to the light-emitting element array chips 125. According to the registration error in the main scanning direction of the light-emitting element array chips 125, the control driver 110 compensates for the registration error by adjusting a timing to apply the start signals to the light-emitting element array chips 125. In other words, the control driver 110 adjusts an exposure timing by adjusting a timing of the start signals input to the light-emitting element array chips 125, thereby correcting an image in the main scanning direction.

The control driver 110 does not output the start signal to the light-emitting element array chip 125, for example, whose print data is all white, from among the light-emitting element array chips 125. When the light-emitting element array chip 125 does not need to emit light, the control driver 110 does not output the start signal to the light-emitting element array chip 125. Because the control driver 110 may separately control the light-emitting element array chips 125, the control driver 110 does not output the start signal to the light-emitting element array chip 125, for example, whose print data is all white, thereby reducing unnecessary power consumption. When print data is all white, there may be no print data, that is, there may be no image to be formed.

The light-emitting element array module 100 includes the control driver 110 and the chip array 120. The chip array 120 includes a plurality of light-emitting element array chips 125. The control driver 110 and the light-emitting element array chips 125 may be connected by wires.

The light-emitting element array chips 125 receive a signal from the control driver 110, respectively, and operate. The light-emitting element array chips 125 operate according to the start signals separately received from the control driver 110, and emit light according to a data signal (or an on signal). The light-emitting element array chips 125 may be arranged in a zigzag manner, and in two lines.

Figure 3:
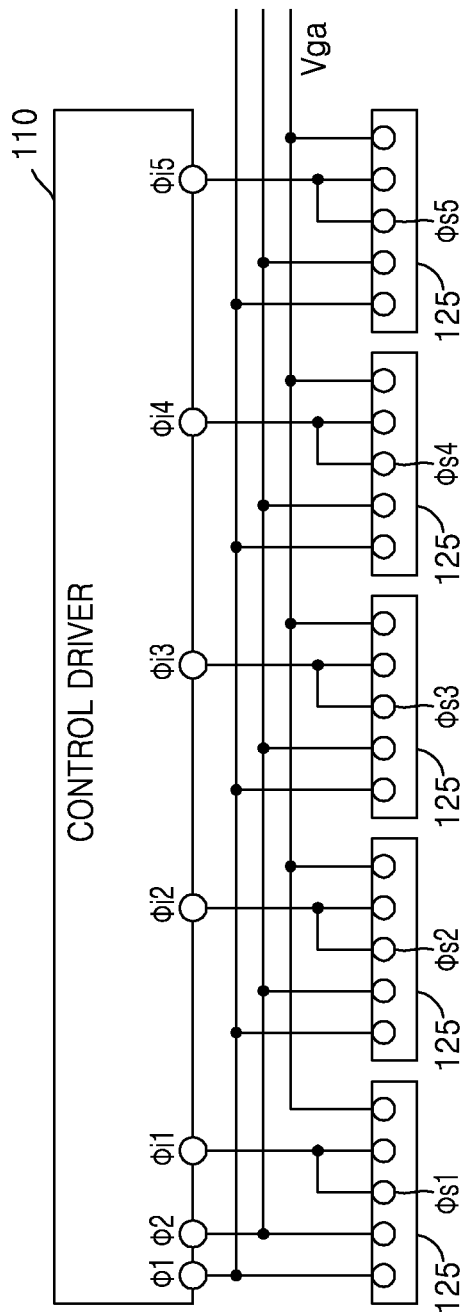
FIG. 3 is a diagram illustrating an example of a light-emitting element array module according to an embodiment.

FIG. 3 is a diagram illustrating an example of a light-emitting element array module according to an embodiment.

The control driver 110 outputs the start signal and the data signal to the light-emitting element array chips 125 through terminals φi1 to φi5. The terminals φi1 to φi5 in the control driver 110 are independently connected to the light-emitting element array chips 125, respectively. Thus, the control driver 110 may separately control the light-emitting element array chips 125 by applying the start signal to each of the light-emitting element array chips 125 through the terminals φi1 to φi5.

The control driver 110 outputs the start signal and the data signal through data lines. The start signal is input through the data lines wherein the start signal is input, before the data signal is input through the data lines. A transfer element array operates after the start signal is applied. The data lines refer to wires connecting the terminals φi1 to φi5 of the control driver 110 to the respective light-emitting element array chips 125. The control driver 110 adjusts input points in time of the start signal and the data signal according to a registration error of each of the light-emitting element array chips 125, thereby controlling an operation point in time of each of the light-emitting element array chips 125. The control driver 110 applies the start signal and data signal to each of the light-emitting element array chips 125 at a delay time according to the registration error of each of the light-emitting element array chips 125, thereby compensating for the registration error. The delay time is a multiple of a cycle of a transfer signal that is applied in each of the light-emitting element array chips 125.

The control driver 110 or the image forming apparatus may further include a memory for storing the registration error and the delay time of each of the light-emitting element array chips 125.

Start signal input terminals φs1 to φs5 of the light-emitting element array chips 125 may be connected in parallel to the data signal input terminals φi1 to φi5 of the light-emitting element array chips 125, respectively. For example, the terminals φi1 and φs1 of the light-emitting element array chips 125 may be connected in parallel to each other. Thus, a separate wire for connecting the control driver 110 and each of the terminals φs1 to φs5 of the light-emitting element array chips 125 is not necessary. The start signal input terminals φs1 to φs5 represent a gate of a transfer element. The data signal input terminals φi1 to φi5 represent a cathode of a light-emitting element.

The control driver 110 outputs transfer signals through terminals φ1 and φ2. The same transfer signals φ1 and φ2 are received by the light-emitting element array chips 125. Vga refers to ground.

Figure 4:
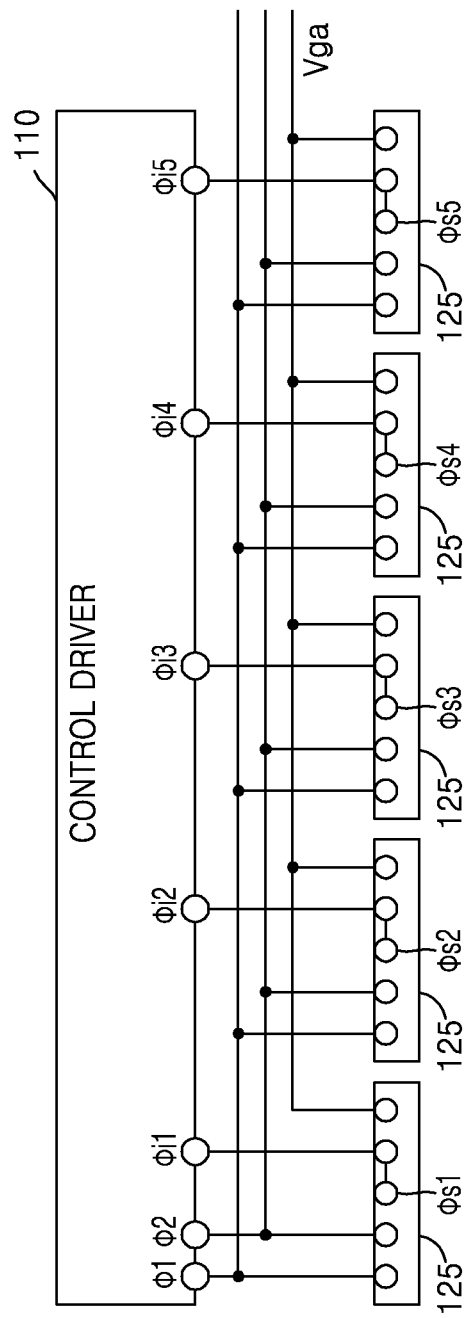
FIG. 4 is a diagram illustrating an example of a light-emitting element array module according to an embodiment.

FIG. 4 is a diagram illustrating an example of a light-emitting element array module according to an embodiment. Referring to FIG. 4, start signal input terminals φs1 to φs5 and data signal input terminals φi1 to φi5 respectively corresponding to the start signal input terminals φs1 to φs5 are connected to each other inside the light-emitting element array chips 125. Therefore, the number of wire bondings outside the light-emitting element array chips 125 may be reduced.

Figure 5:
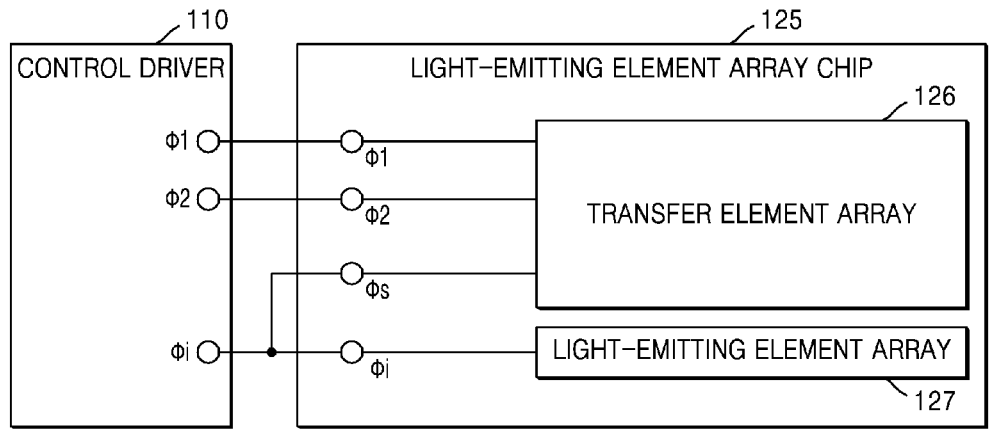
FIG. 5 is a block diagram of a light-emitting element array module according to an embodiment.

FIG. 5 is a block diagram of a light-emitting element array module according to an embodiment. Referring to FIG. 5, a terminal φi of a light-emitting element array 127 and a terminal φs of a transfer element array 126 may be connected in parallel to each other.

The control driver 110 applies signals to the transfer element array 126 and a light-emitting element array 127 of the light-emitting element array chips 125. The control driver 110 applies the start signal to control an operation point in time of the transfer element array 126 through a terminal φi of the control driver 110.

The transfer element array 126 includes a plurality of transfer elements that operate based on a start signal and a transfer signal. The transfer element array 126 starts operation when the start signal is applied through the terminal φs. The plurality of transfer elements that are included in the element array 126 sequentially operate.

The light-emitting element array 127 includes a plurality of light-emitting elements that operate based on a data signal.

The light-emitting conditions of the light-emitting elements may be determined according to the states of the transfer elements. The transfer elements and the light-emitting elements may be one-to-one matched. In order for a light-emitting element to emit light, a transfer element corresponding to the light-emitting element has to be in a standby state. When the transfer element is in a standby state, the on/off of the light-emitting element may be determined according to the data signal input to the light-emitting element. When a start signal is input to the transfer elements, the transfer elements sequentially enter a standby state according to a transfer signal.

The control driver 110 outputs a start signal to the transfer element array 126 by using the data signal applied to the light-emitting element array 127. The control driver 110 outputs a start signal to the transfer element array 126 through the terminal φi of the control driver 110. After outputting the start signal, the control driver 110 outputs the data signal to the light-emitting element array 127 through the terminal φi of the light-emitting element array 127 from the terminal φi of the control driver 110.

A start signal input terminal (terminal φs) of the transfer element array 126 and a data signal input terminal (terminal φi) of the light-emitting element array 127 may be connected to an output terminal (terminal φi) of the control driver 110. Thus, the signal (φi signal) output from the control driver 110 may be input simultaneously to the transfer element array 126 and the light-emitting element array 127. Thus, the start signal input terminal φs of the transfer element array 126 and the control driver 110 are not connected by a separate wire.

The transfer element array 126 includes a plurality of transfer elements, and the light-emitting element array 127 includes a plurality of light-emitting elements. The transfer elements may be controlled by a start signal and transfer signals (that is, φ1 and φ2). The transfer elements start operating when the start signal and the transfer signal φ1 are applied at the same time. In other words, the transfer elements start operating when the start signal is applied through the terminal φs of the transfer element array 126 while the transfer signal φ1 is applied. The light-emitting element array 127 may be turned on according to the state of the data signal and the transfer element.

The transfer signal may have two alternate potentials. When a first voltage is a high-level voltage, a second voltage is a low-level voltage.

The start signal may have a voltage level opposite to that of the transfer signal φ1. For example, if the transfer signal φ1 has a low-level voltage, the start signal may have a high-level voltage. On the other hand, if the transfer signal φ1 has a high-level voltage, the start signal may have a low-level voltage. The control driver 110 may control operations of the transfer elements by applying the start signal according to a cycle of the transfer signals φ1 and φ2.

Figure 6:
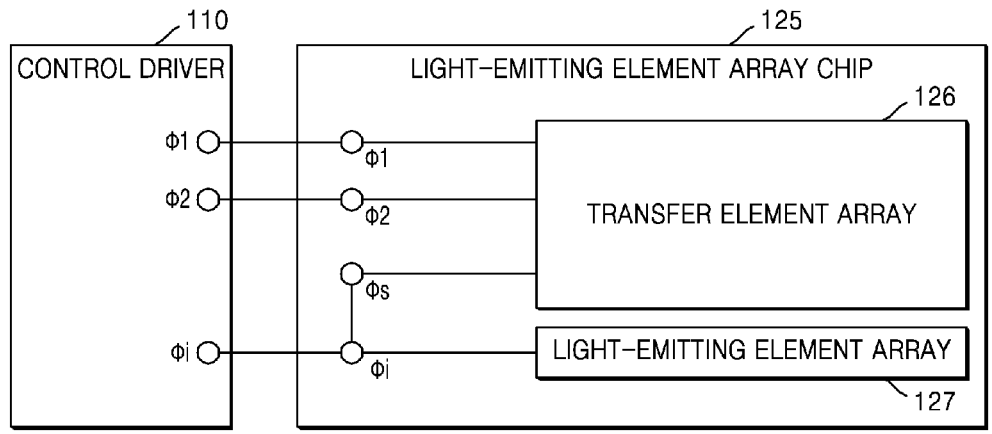
FIG. 6 is a block diagram of a light-emitting element array module according to an embodiment.

FIG. 6 is a block diagram of a light-emitting element array module according to an embodiment. Referring to FIG. 6, the terminal φi of the light-emitting element array 127 and the terminal φs of the transfer element array 126 may be connected to each other inside the light-emitting element array chip 125.

Figure 7:
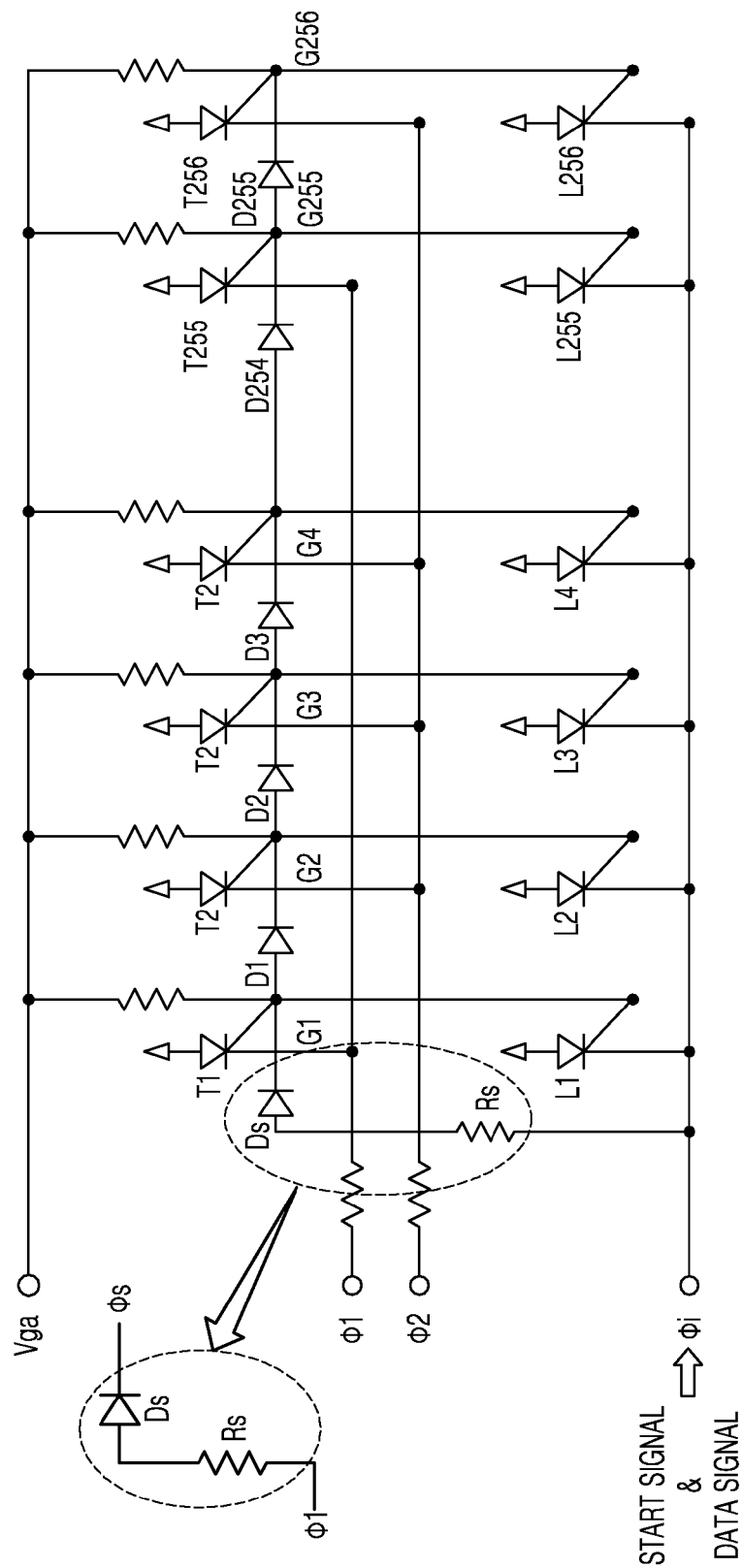
FIG. 7 is a diagram illustrating an example of a light-emitting element array chip according to an embodiment.

FIG. 7 is a diagram illustrating an example of a light-emitting element array chip according to an embodiment.

Referring to FIG. 7, a start signal and a data signal are input through the same terminal φi. The light-emitting element array chip 125 includes a diode Ds that is connected in forward direction and a resistor Rs. The start signal and the data signal are input to the terminal φi of the light-emitting element array chip 125. The level of the voltage of the start signal is the same as the maximum level of the voltage of the data signal. Thus, transfer elements or light-emitting elements do not operate before the start signal is input to the light-emitting element array chip 125.

Operations of the transfer elements and the light-emitting elements are disclosed.

The light-emitting element array 127 includes a plurality of light-emitting thyristors, and the transfer element array 126 includes a plurality of transfer thyristors. In other words, the light-emitting elements may be light-emitting thyristors, and the transfer elements may be transfer thyristors. The light-emitting elements are represented as L1 to L256 and the transfer elements are represented as T1 to T256.

The thyristor has a PNPN junction structure and includes a gate. In FIG. 7, 256 thyristors are included in one light-emitting element array chip 125, and G1 through G256 respectively denote gate terminals of the thyristors. When a voltage of a determined level or more is applied to a gate of the thyristor, a breakdown voltage of the thyristor is lowered, and thus an operation voltage of the thyristor is lowered. Thus, by applying a voltage to the gate of the thyristor, the thyristor may be operated by a lower driving voltage.

The start signal supplies a voltage to a gate G1 of a transfer thyristor T1. The start signal is supplied to the gate G1 through the diode Ds. The transfer thyristor T1 starts operating when the start signal and the transfer signal φ1 are applied at the same time. After that, the transfer thyristors T2 to T256 sequentially enter an operating state according to the transfer signals φ1 and φ2.

When the transfer thyristor T1 is in an operating state, the light-emitting element L1 enters a light-emitting state. The gate G1 of the transfer thyristor T1 is equal to the gate of the light-emitting thyristor L1. Thus, when the transfer thyristor T1 enters an operating state, the light-emitting thyristor L1 also enters an operating state. When the light-emitting thyristor L1 is in an operating state, the light-emitting thyristor L1 emits light according to the data signal input through the terminal φi.

By repetition of the process, the transfer thyristors T1 to T256 sequentially enter an operating state, and the light-emitting thyristors L1 to L256 enter an operating state, and sequentially emit light or do not emit light.

The start signal and the data signal are input through the terminal φi. The start signal is applied to the gate G1 of the transfer thyristor T1 through the resistor Rs and the diode Ds. The start signal is input before the data signal is input. The start signal is applied to each of the light-emitting element array chips 125 while the transfer signal φ1 is input, thus determining an input point in time of the start signal according to the registration error of each of the light-emitting element array chips 125.

Figure 8:
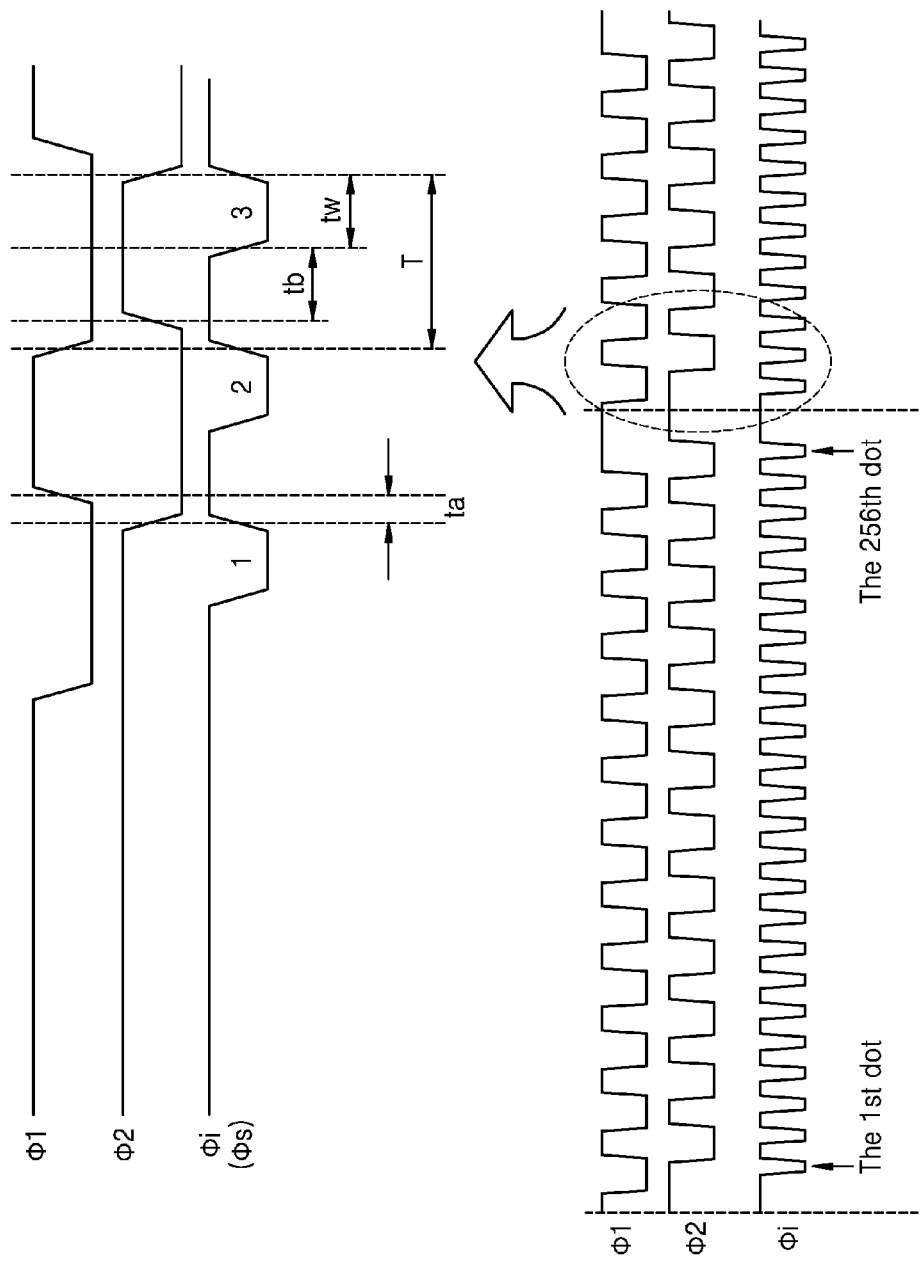
FIG. 8 is a timing diagram of signals output from a control driver.

FIG. 8 is a timing diagram of signals output from a control driver. Referring to FIG. 8, the control driver 110 may drive transfer elements without a separate start signal.

As shown in FIG. 8, the control driver 110 maintains a high-level voltage through the terminal φi. The control driver 110 outputs a data signal while maintaining the high-level voltage. The control driver 110 outputs a first data signal when a φ1 signal is in a low state. Therefore, the light-emitting element array module 100 may drive the transfer elements without applying a separate start signal.

A first transfer signal φ1 may be applied to odd-numbered transfer thyristors, and a second transfer signal φ2 may be applied to even-numbered transfer thyristors.

The first transfer signal φ1 and the second transfer signal φ2 have two potentials of a high-level and a low-level and alternately enter a high state and a low state. The first transfer signal φ1 and the second transfer signal φ2 overlap with each other during a time ta. This is to allow the next transfer thyristor to enter a standby state before an operation of the previous transfer thyristor is ended. A time tb is a time determined for stable operation of the light-emitting element, and a time tw is a time when the light-emitting element actually operates.

Figure 9:
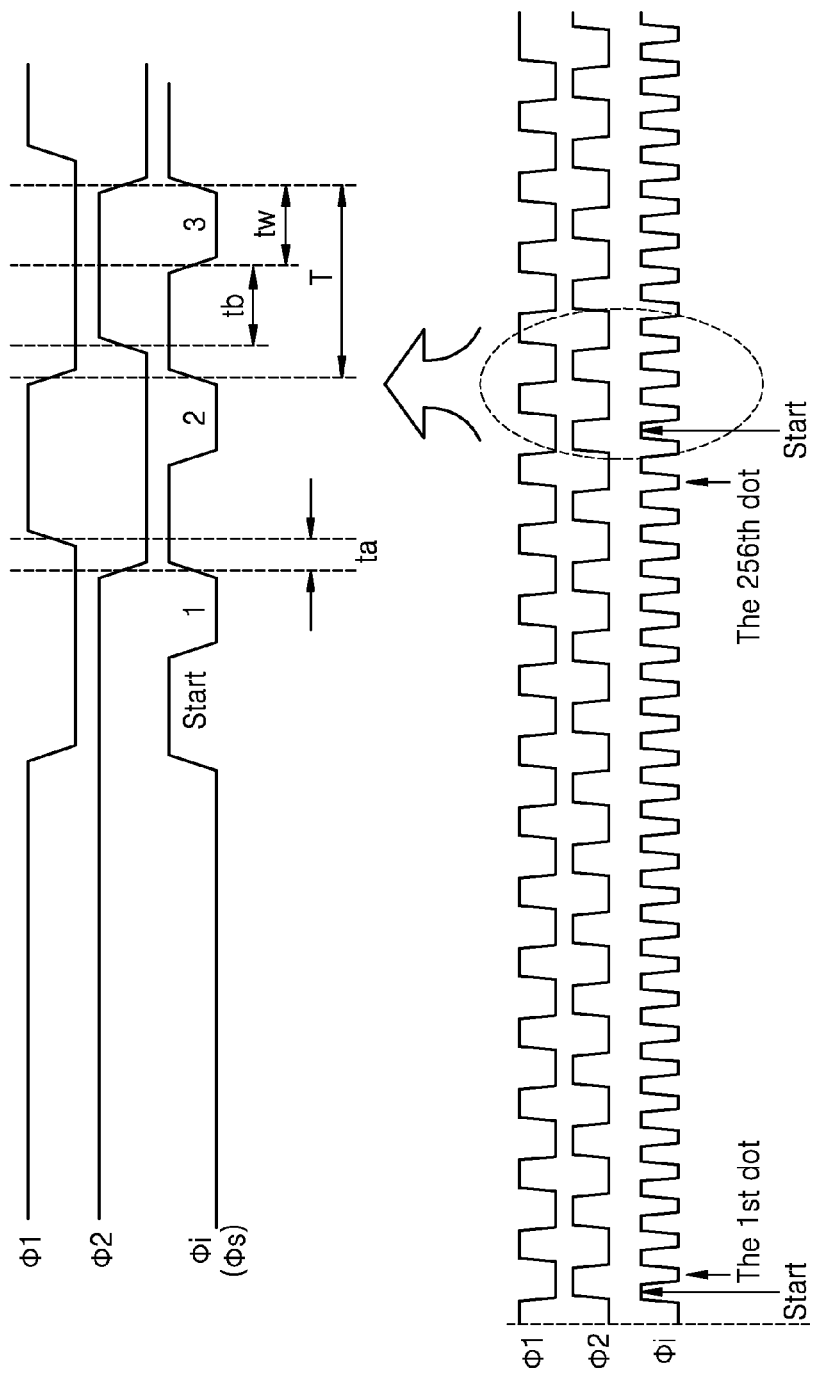
FIG. 9 is a timing diagram of signals output from the control driver.

FIG. 9 is a timing diagram of signals output from the control driver. Referring to FIG. 9, the control driver 110 may separately control the light-emitting element array chips 125 by applying a separate start signal.

As shown in FIG. 9, the control driver 110 applies a start signal before outputting the data signal through the terminal φi. The part represented as "start" in FIG. 9 corresponds to the start signal. The control driver 110 may apply the start signal by maintaining the high-level voltage for a certain period of time before outputting the data signal. However, the control driver 110 may apply the start signal when the transfer signal φ1 is in a low state.

The control driver 110 may determine a point in time to apply the start signal according to each of the light-emitting element array chips 125. Because the light-emitting element array chips 125 have mutually different registration errors, the control driver 110 may determine the point in time to apply the start signal according to the registration error. In addition, the start signal is applied when the transfer signal φ1 is in a low-level. Therefore, the control driver 110 may apply the start signal that is delayed by a cycle of the transfer signal φ1.

For example, if duration in a high-level or in a low-level of the transfer signal φ1 is T, the control driver 110 may apply the start signal for every 2T. This will be described in detail in FIGS. 10 through 12.

The start signal φs is applied when the first transfer signal φ1 is in a low state, and a first transfer thyristor T1 turns on. At this time, the control driver 110 turns on the first light-emitting thyristor L1 by using the data signal φi. Thereafter, when the first transfer signal φ1 enters a high state and the second transfer signal φ2 enters a low state, the control driver 110 turns on the second light-emitting thyristor L2 by using the data signal φi. By repetition of the process, the control driver 110 may turn on the first to 256th light-emitting thyristors L1 to L256.

Figure 10:
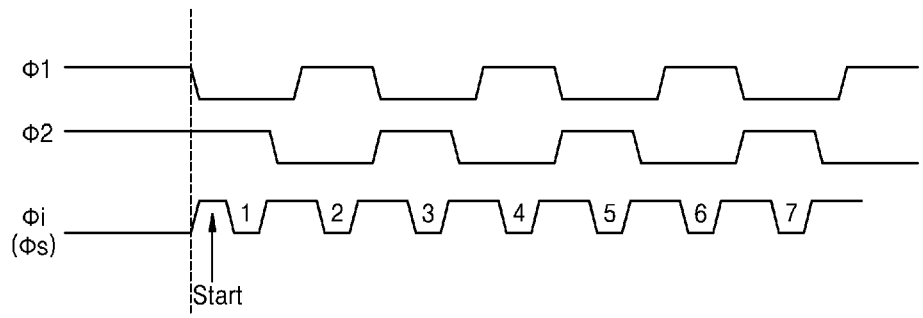
FIGS. 10, 11, and 12 are diagrams illustrating an applying timing of a start signal.
Figure 11:
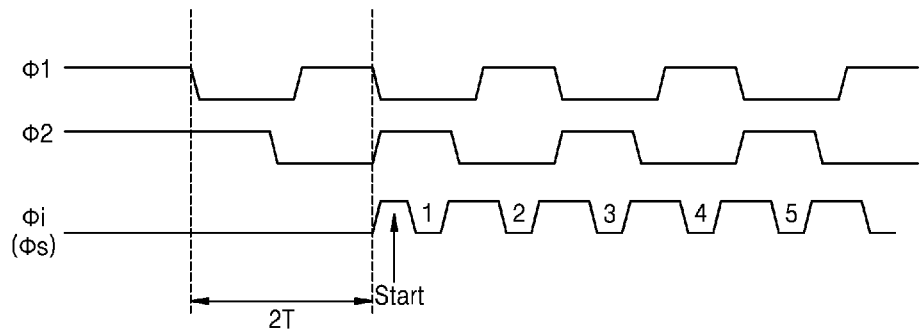
Figure 12:
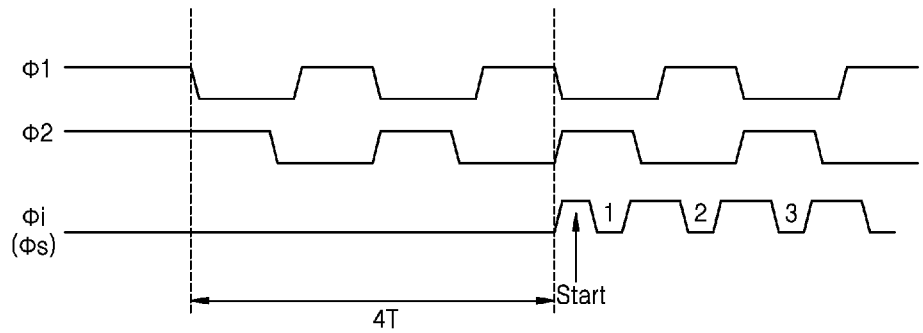

FIGS. 10 through 12 are diagrams illustrating an applying timing of a start signal. Referring to FIGS. 10 through 12, the control driver 110 may apply a start signal and a data signal that are delayed, according to a registration error of the light-emitting element array chips 125. The control driver 110 may apply the delayed start signal according to a cycle of the transfer signal φi1. Because the control driver 110 is required to apply a start signal in a high-level when the transfer signal φ1 is in a low-level, the control driver 110 applies the start signal at a point in time when the transfer signal φ1 enters a low state.

FIG. 10 illustrates an example of applying a start signal and a data signal without delay. A high-level signal represented as "start" is a start signal, and the control driver 110 applies the start signal without delay. In other words, the control driver 110 applies the start signal at a point in time when the transfer signal φ1 is applied. The control driver 110 sequentially applies the data signal after the start signal is applied.

FIG. 11 illustrates an example of applying a start signal and a data signal that are delayed by 2T. The control driver 110 applies the start signal and the data signal at the time delayed by 2T to compensate for the registration error of the light-emitting element array chips 125. Because the control driver 110 applies the start signal through the terminal φi, the control driver 110 may separately apply the start signal to each of the light-emitting element array chips 125. For example, if there is a registration error of 2T in the light-emitting element array chip 125, the control driver 110 may apply the start signal at the time delayed by 2T.

FIG. 12 illustrates an example of applying a start signal and a data signal that are delayed by 4T. The control driver 110 applies the start signal and the data signal at the time delayed by 4T to compensate for the registration error of the light-emitting element array chips 125.

Although FIGS. 10 through 12 illustrate examples wherein delay times are 0 to 4T, the delay times may change according to the registration error of the light-emitting element array chips 125. In addition, if a compensation time for the registration error does not correspond to a multiple of 2T, the control driver 110 may determine a multiple of 2T that is the closest to the compensation time for the registration error as delay times, and may apply the start signal according to the delay times.

Figure 13:
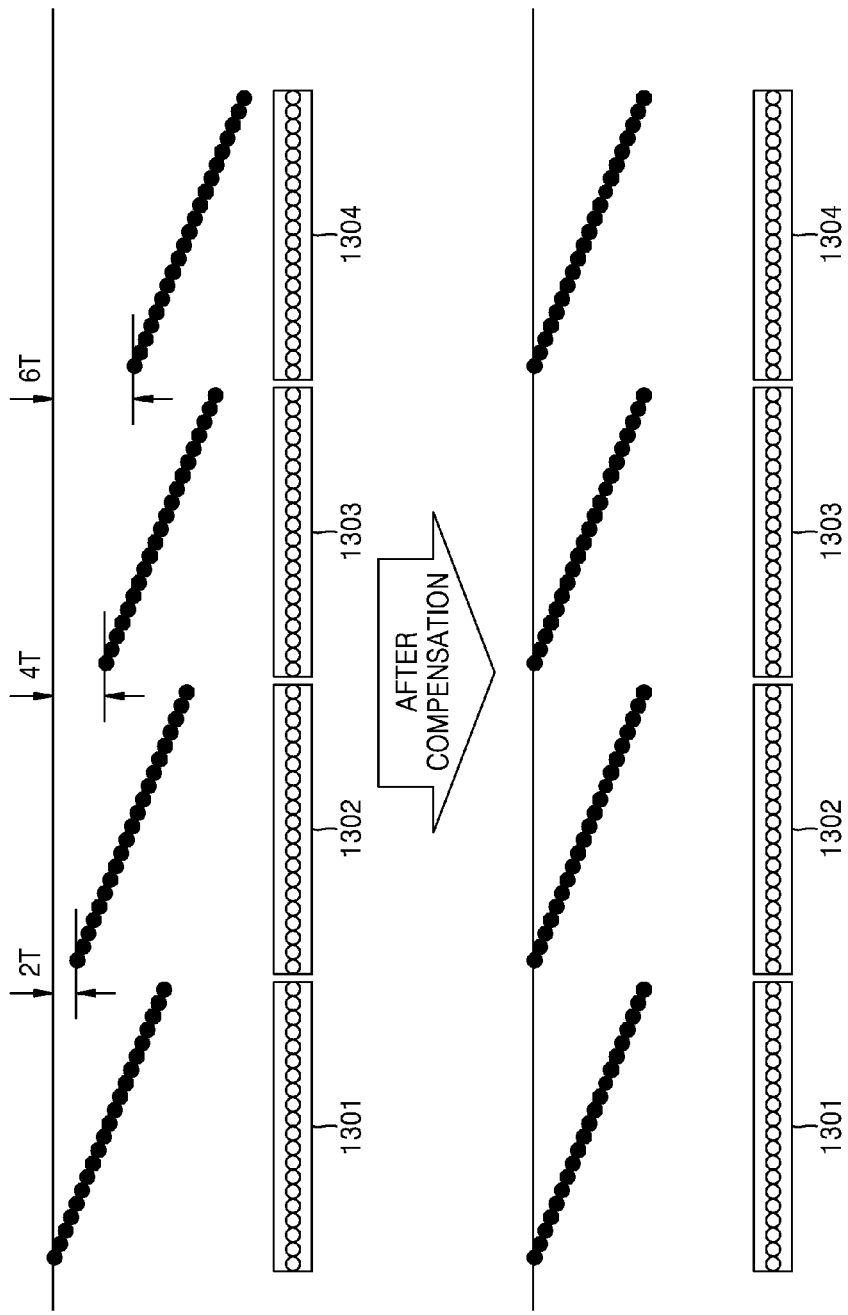
FIG. 13 is a diagram illustrating compensating for a registration error of light-emitting element array chips.

FIG. 13 is a diagram illustrating compensating for a registration error of light-emitting element array chips. Positions of the light-emitting element array chips 125 may not properly arranged during the process. Therefore, offset of the light-emitting element array chips 125 needs to be compensated for.

On the basis of a first light-emitting element array chip 1301, a 2-dot offset was generated in a second light-emitting element array chip 1302, a 4-dot offset was generated in a third light-emitting element array chip 1303, and a 6-dot offset was generated in a fourth light-emitting element array chip 1304.

The control driver 110 adjusts an applying point in time of data according to the offset. The control driver 110 checks offsets of the first to fourth light-emitting element array chips 1301 to 1304, and determines delay times corresponding to the offsets. When the control driver 110 applies a data signal to the second light-emitting element array chip 1302, the control driver 110 applies the data signal by compensating for time by 2T. When the control driver 110 applies a data signal to the third light-emitting element array chip 1303, the control driver 110 applies the data signal by compensating for time by 4T. When the control driver 110 applies a data signal to the fourth light-emitting element array chip 1304, the control driver 110 applies the data signal by compensating for time by 6T.

Because data lines are separately connected between the control driver 110 and the first to fourth light-emitting element array chips 1301 to 1304, the control driver 110 may determine a point in time when the data signal is applied to each of the light-emitting element array chips 1301 to 1304. Therefore, the control driver 110 may determine a delay time corresponding to each of the first to fourth light-emitting element array chips 1301 to 1304, and adjust the point in time when the data signal is applied according to the determined delay time. In addition, the delay times may be determined in advance during the process and stored in a memory so that the control driver 110 may apply the data signal by referring to the delay times of the light-emitting element array chips 125 that are stored in the memory.

Figure 14:
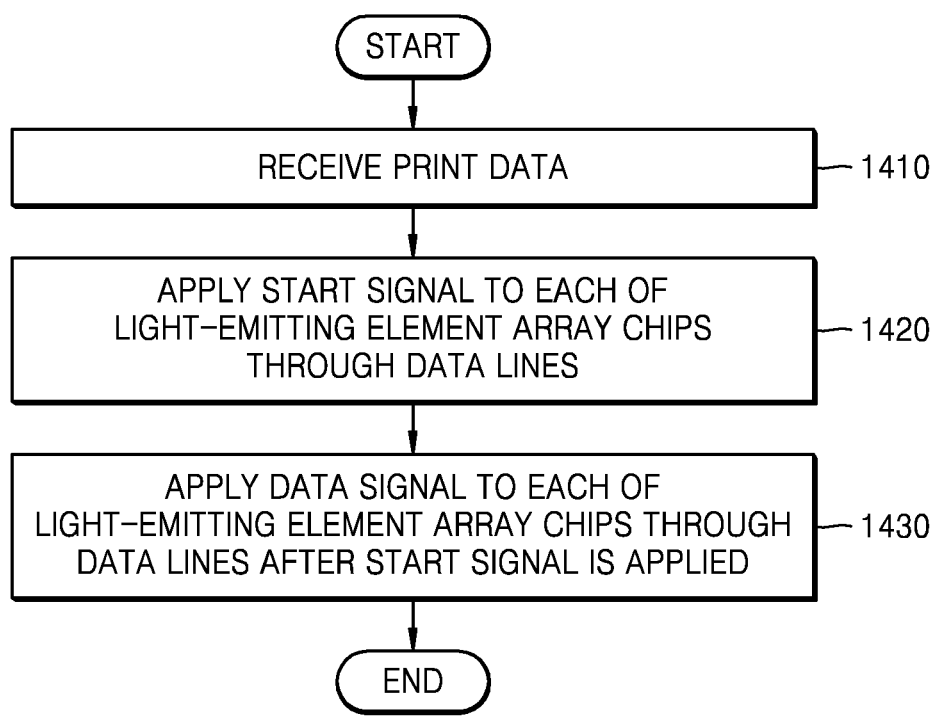
FIG. 14 is a flowchart of a method of controlling light-emitting element array chips according to an embodiment.

FIG. 14 is a flowchart of a method of controlling light-emitting element array chips according to an embodiment.

In operation 1410, the control driver 110 receives print data. The print data may be received from the CPU or the PC 50. The print data is data about an image that is to be printed by the image forming apparatus.

In operation 1420, the control driver 110 applies a start signal to each of the light-emitting element array chips through the data lines. The control driver 110 applies a start signal to the transfer element array 126 by using a signal applied to the light-emitting element array 127 of the light-emitting element array chips 125.

The control driver 110 controls operation points in time of the light-emitting element array chips 125 by separately applying start signals to the light-emitting element array chips 125. The chip array 120 includes the plurality of light-emitting element array chips 125. The control driver 110 may apply the start signal to each of the light-emitting element array chips 125 at different points in time.

According to the registration error in a main scanning direction of the light-emitting element array chips 125, the control driver 110 compensates for the registration error by adjusting a timing to apply the start signal to each of the light-emitting element array chips 125. A registration error exists between the light-emitting element array chips 125, and the control driver 110 controls the operation points in time of the light-emitting element array chips 125 in order to compensate for the registration errors. In other words, the control driver 110 adjusts an exposure timing by adjusting a timing of the start signal input to each of the light-emitting element array chips 125, thereby correcting an image in the main scanning direction.

The control driver 110 transfers a data signal indicating an image to the light-emitting element array 127. The data signal indicates the on/off of the light-emitting elements.

In operation 1430, the control driver 110 applies the data signal to each of the light-emitting element array chips 125 through the data lines after the start signal is applied. The control driver 110 applies the data signal to each of the light-emitting element arrays 127 after the start signals are applied and transfer elements start operating.

Figure 15:
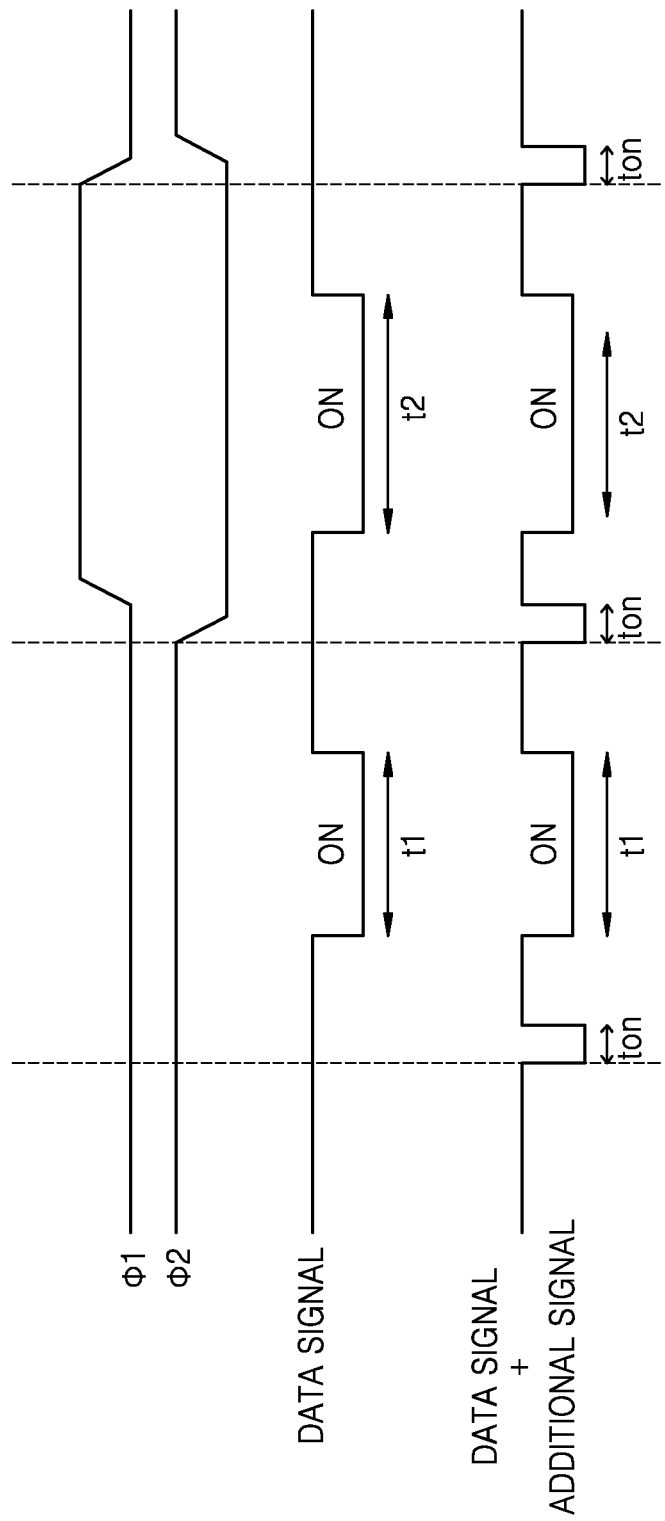
FIG. 15 is a timing diagram of a method of controlling operation of a transfer element by applying an additional signal.

FIG. 15 is a timing diagram of a method of controlling operation of a transfer element by applying an additional signal. Referring to FIG. 15, the control driver 110 may apply an additional signal emitting the light-emitting elements for a certain period of time (ton).

The additional signal, a signal to emit each of the light-emitting elements, is applied through data lines during the time ton. Time ton may be a very short time of about a few nanoseconds. In addition, the additional signal may be applied at a point in time when a transfer signal is changing from a high-level to a low-level. The point in time when the transfer signal is changing from a high-level to a low-level may refer to a point in time when the transfer signal is lowered from a high-level voltage to a low-level voltage. The additional signal may be applied at a point in time when the transfer signal φ1 is changing from a high-level to a low-level, or at a point in time when the transfer signal φ2 is changing from a low-level to a high-level. In addition, the additional signals may be applied at all points in time when the transfer signals φ1 and φ2 are changing from a high-level to a low-level. FIG. 15 illustrates that the point in time when the transfer signal φ1 is lowered from a high-level and the point in time when the additional signal is applied coincide with each other, but the points do not always coincide with each other.

The control driver 110 determines applying time of the additional signal in order to avoid forming a latent image on a photoconductor drum, and applies the additional signal during the determined time ton. The latent image is not formed on the photoconductor drum even if the light-emitting elements are turned on by the additional signal. In other words, the control driver 110 determines a time during which a latent image may not be formed on the photoconductor drum even if the light-emitting element emits light, and applies the additional signal during the determined time ton.

Referring to FIG. 7, because the gates of the light-emitting elements L1 to L256 are connected to each of the gates of the transfer elements T1 to T256, operation of the light-emitting elements L1 to L256 may affect the transfer elements T1 to T256. Therefore, applying the additional signals to the light-emitting elements L1 to L256 at points in time when the transfer signals $\phi 1$ and $\phi 2$ that are applied to the transfer elements T1 to T256 are changing from a high-level to a low-level, may affect the operations of the transfer elements T1 to T256. When the light-emitting elements emit light, a gate potential of the light-emitting element becomes 3.3 V (Vcc). A gate potential of the transfer element connected to the light-emitting element also becomes 3.3 V. The gate potential of the transfer element is sequentially transferred to the next transfer element, and a gate potential of the next transfer element becomes about 1.8 V. The light-emitting element helps operation of the transfer element when the gate potential is transferred to the next transfer element.

Another method of helping operation of the transfer element is to make the gate voltage of each of the transfer elements higher than that of the first transfer element. In other words, a voltage that is higher than a high-level voltage of the transfer signal is applied to an anode of the transfer element to be VG2, VG3, VG4, . . . , and VG256>VG1.

Referring to FIG. 15, when only a data signal is applied, the only data signal indicating whether the light-emitting element is turned on/off according to the transfer signals $\phi 1$ and $\phi 2$, may be applied to the light-emitting elements. A low-level voltage is applied to a data signal turning on the light-emitting element during the time t1 or t2. An emitting time of the light-emitting element is changed according to the length of the time t1 or t2 and the size of the latent image that is formed on the photoconductor drum becomes greater as the emitting time of the light-emitting element becomes longer.

When the data signal and the additional signal are applied, the additional signal is applied to the light-emitting elements according to the changes of the transfer signals $\phi 1$ and $\phi 2$. The additional signal may be applied before or after the data signal is applied.

Figure 16:
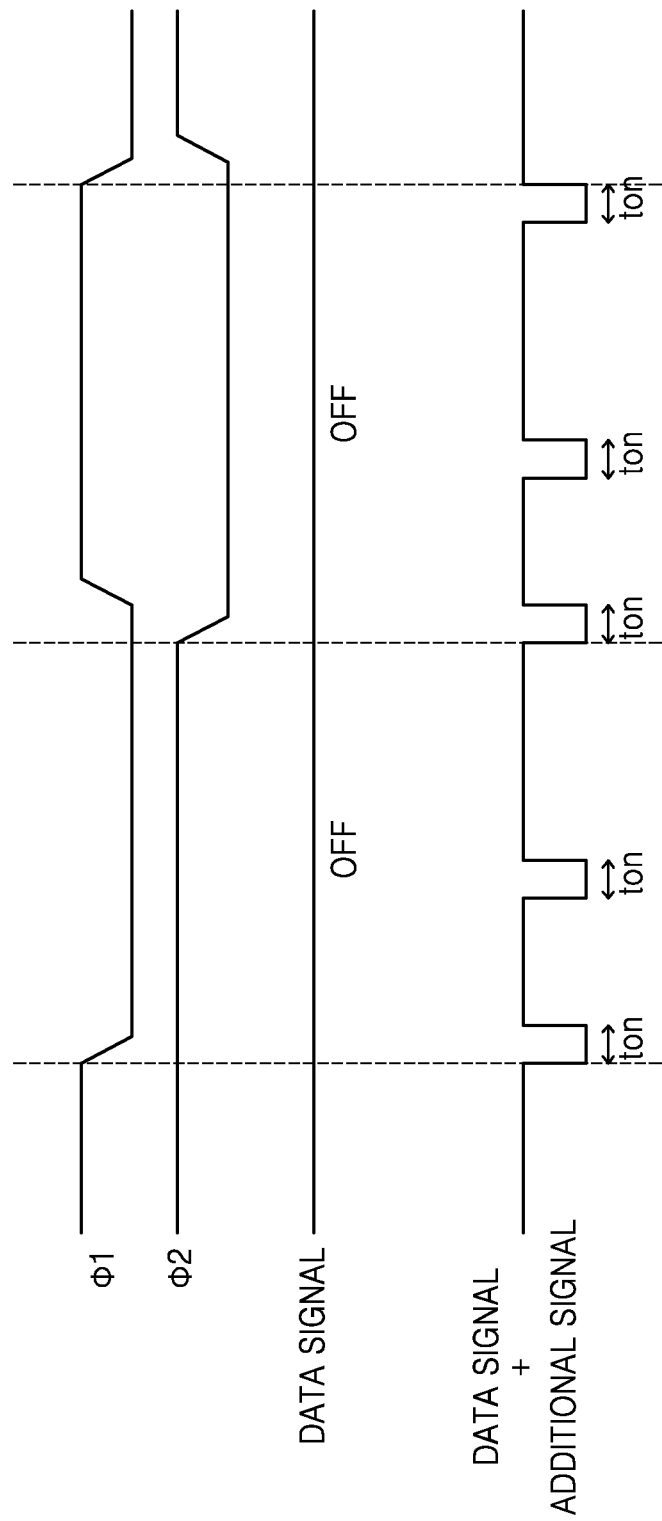
FIG. 16 is a timing diagram of a method of controlling operation of the transfer element by applying the additional signal.

FIG. 16 is a timing diagram of a method of controlling operation of the transfer element by applying the additional signal. FIG. 16 illustrates an example wherein the control driver 110 applies the additional signal when a data signal is turned off.

Because the data signal is turned off in FIG. 16, the data signal maintains high-level voltage.

The control driver 110 may further apply the additional signal when the data signal is turned off. In other words, the control driver 110 may apply the additional signal not only at points in time when the transfer signals $\phi 1$ and $\phi 2$ are changing from a high-level voltage to a low-level voltage, but also during the time when the transfer signals $\phi 1$ and $\phi 2$ maintain a low-level.

The additional signals are further applied one time during the time when the transfer signals $\phi 1$ and $\phi 2$ maintain a low-level in FIG. 16, but the additional signal may be applied at least two times. In addition, the additional signals have a rectangular pulse shape in FIG. 16, but the additional signals may be applied in various shapes, such as a triangle pulse and so on.

Figure 17:
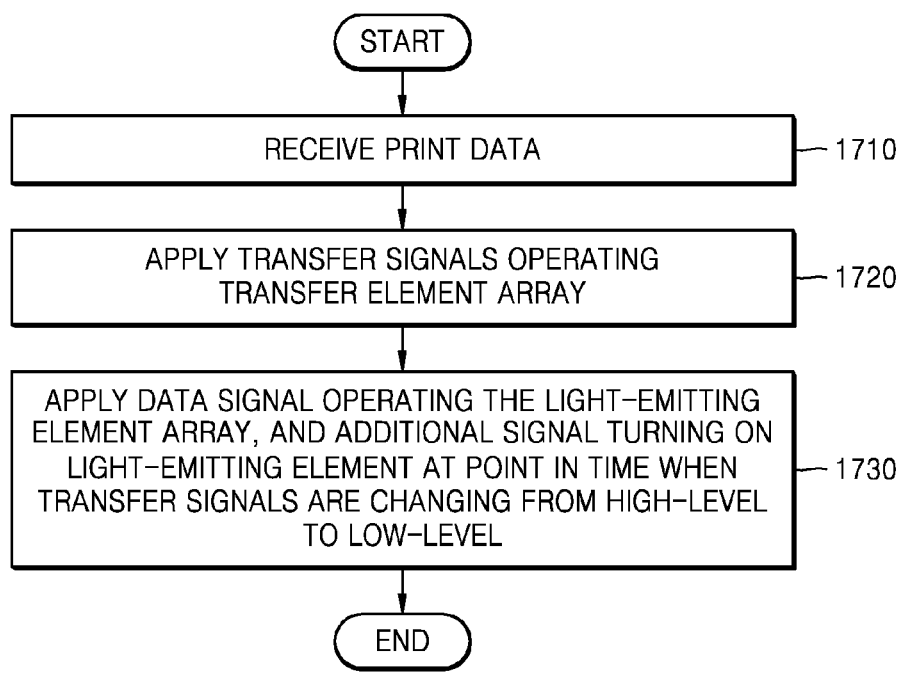
FIG. 17 is a flowchart of a method of controlling light-emitting element array chips according to an embodiment.

FIG. 17 is a flowchart of a method of controlling light-emitting element array chips according to an embodiment.

In operation 1710, the control driver 110 receives print data.

In operation 1720, the control driver 110 applies transfer signals operating the transfer element array 126. The transfer signals indicate the first transfer signal $\phi 1$ operating odd-numbered transfer elements, and the second transfer signal $\phi 2$ operating even-numbered transfer elements.

In operation 1730, the control driver 110 applies the data signal operating the light-emitting element array 127, and the additional signal emitting the light-emitting element at a point in time when the transfer signal is changing from a high-level to a low-level. In addition, the control driver 110 further applies the additional signal during the time when the data signal is applied when the data signal is turned off.

As described above, according to the one or more of the above embodiments, because the start signal input terminals of the transfer element array are connected in parallel to the data signal input terminals of the light-emitting element array, the number of wire bondings in the light-emitting array module may be reduced.

According to a method of controlling the light-emitting element array chips, the light-emitting element array chips may be separately controlled by adjusting the point in time when the start signal is output to each of the light-emitting element array chips.

According to a method of controlling the light-emitting element array chips, the registration errors of the light-emitting element array chips may be compensated for by separately controlling the light-emitting element array chips.

According to a method of controlling the light-emitting element array chips, operations of transfer elements may be affected by applying an additional signal and a data signal to the light-emitting elements.

The apparatuses according to an embodiment may include a processor, a memory for storing and executing program data, a permanent storage such as a disk drive, a communication port for communicating with an external device, and user interface (UI) devices such as a touch panel, keys, and buttons. Methods implemented by a software module or algorithm may be stored on a non-transitory computer-readable recording medium as computer-readable codes or program commands that are executable on the processor. Examples of the computer-readable recording medium include magnetic storage media (e.g., read-only memories (ROMs), random-access memories (RAMs), floppy disks, and hard disks) and optical recording media (e.g., compact disc-read only memories (CD-ROMs) and digital versatile discs (DVDs)). The computer-readable recording medium may also be distributed over network-coupled computer systems so that the computer-readable codes may be stored and executed in a distributed fashion. The computer-readable recording medium is readable by a computer, and may be stored in a memory and executed in a processor.

The embodiments may be described in terms of functional block components and various processing operations. A functional block may be implemented by hardware and/or software components. For example, an embodiment may employ various integrated circuit (IC) components, such as memory elements, processing elements, logic elements, and lookup tables, which may execute various functions under the control of one or more microprocessors or other control devices. An element may be implemented by software programming or software elements, and implemented by a programming or scripting language such as C, C++, Java, or assembly language, with various algorithms being implemented by a combination of data structures, processes, routines, or other programming elements. A functional aspect may be implemented by an algorithm that is executed in one or more processors. A "mechanism," "element," "unit," and "configuration" are not limited to mechanical and physical configurations, and may include software routines in conjunction with processors or the like.

Particular implementations described herein are merely exemplary, and do not limit the scope of the inventive concept. Connection lines or connection members illustrated in the drawings represent functional connections and/or physical or logical connections between the various elements, and various alternative or additional functional connections, physical connections, or logical connections may be used.

The use of the terms "a," "an," and "the" and similar referents in the context of the specification (especially in the context of the following claims) may be construed to cover both the singular and the plural. Also, recitation of a range of values herein refer separately to each separate value falling within the range, unless otherwise indicated herein, and each separate value is incorporated into the specification as if it were separately recited herein. The operations of the method described herein may be performed in any suitable order unless otherwise indicated herein or otherwise clearly contradicted by the context. The scope of the inventive concept is not limited to the above-described operation order. Examples or terms (e.g., "such as") provided herein are used to describe the embodiments in detail, and the scope is not limited by the examples or terms unless otherwise claimed. Also, those of ordinary skill in the art will readily understand that various modifications and combinations may be made according to design conditions and factors without departing from the spirit and scope of the inventive concept as defined by the following claims.

It should be understood that the embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A light-emitting element array module comprising:
a control driver configured to receive print data; and
a plurality of light-emitting element array chips, each configured to receive a signal from the control driver,
wherein each of the plurality of light-emitting element array chips is connected to the control driver through a respective data line, and
the control driver controls an operation point in time of each of the plurality of light-emitting element array chips by adjusting input points in time of a start signal applied through the data line and a data signal according to a registration error of each of the plurality of light-emitting element array chips.

2. The light-emitting element array module of claim 1, wherein the control driver compensates for the registration error by applying the start signal and data signal to each of the plurality of light-emitting element array chips at a delay time according to the registration error of each of the plurality of light-emitting element array chips.

3. The light-emitting element array module of claim 2, wherein the delay time is a multiple of a cycle of each of transfer signals that are applied in the plurality of light-emitting element array chips.

4. The light-emitting element array module of claim 1, wherein
each of the plurality of light-emitting element array chips include a transfer element array and a light-emitting element array, and
start signal input terminals of the transfer element array are connected in parallel to the data line.

5. The light-emitting element array module of claim 1, further comprising a memory for storing information about the operation points in time of the plurality of light-emitting element array chips.

6. A method of controlling a plurality of light-emitting element array chips, the method comprising:
receiving print data;
applying a start signal to each of the plurality of light-emitting element array chips through a data line; and
applying a data signal to each of the plurality of light-emitting element array chips through the data line after the start signal is applied,
wherein the applying of the start signal comprises applying the start signal at an operation point in time of each of the plurality of light-emitting element array chips according to a registration error of each of the plurality of light-emitting element array chips.

7. The method of claim 6, wherein the applying of the start signal comprises compensating for the registration error by applying the start signal to each of the plurality of light-emitting element array chips at a delay time according to the registration error of each of the plurality of light-emitting element array chips.

8. The method of claim 7, wherein the delay time is a multiple of a cycle of each of transfer signals that are applied in the plurality of light-emitting element array chips.

9. The method of claim 6, wherein a voltage level of the start signal is the same as a high-level voltage of the data signal.

10. A method of controlling a plurality of light-emitting element array chips included in an image forming apparatus, the method comprising:
receiving print data;
applying a transfer signal through a data line operating a transfer element array;
applying a data signal operating a light-emitting element array; and
applying an additional signal for a light-emitting element at a point in time when the transfer signal is changing from a high-level to a low-level.

11. A method of claim 10, wherein the applying of the additional signal comprises determining applying time of the additional signal to avoid forming a latent image on a photoconductor drum, and applying the additional signal during the determined time.

12. A light-emitting element array module included in an image forming apparatus comprising:
a light-emitting element array chip configured to have a light-emitting element array and a transfer element array; and
a control driver configured to apply a transfer signal through a data line operating a transfer element array by receiving print data, and a data signal operating a light-emitting element array, wherein the control driver applies an additional signal for a light-emitting element at a point in time when the transfer signal is changing from a high-level to a low-level.

13. The light-emitting element array module of claim 12, wherein the control driver determines applying time of the additional signal to avoid forming a latent image on a photoconductor drum, and applies the additional signal during the determined time.

14. An apparatus comprising:
a chip array comprising a light-emitting element array chip;
a control driver to control the light-emitting element array chip;
a lens array to transmit light emitted from the light-emitting element array chip; and
a photoconductor drum to receive the light transmitted through the lens array,
wherein a start signal input terminal of the light-emitting element array chip is connected to a data signal input terminal of the light-emitting element array chip and an output terminal of the control driver.

15. The apparatus of claim 14, wherein the light-emitting element array chip comprises:
a transfer element array comprising the start signal input terminal, and
a light-emitting element array comprising the data signal input terminal.

16. The apparatus of claim 14, wherein the start signal input terminal and the data signal input terminal are connected internally in the light-emitting element array chip.

* * * * *